Sept. 8, 1953

C. J. GARDETTO 2,651,347

EMERGENCY TRACTION DEVICE

Filed Nov. 17, 1949

INVENTOR.
CHARLES J. GARDETTO
BY
Wheeler, Wheeler & Wheeler
ATTORNEYS

Sept. 8, 1953
C. J. GARDETTO
2,651,347
EMERGENCY TRACTION DEVICE
Filed Nov. 17, 1949
2 Sheets-Sheet 2
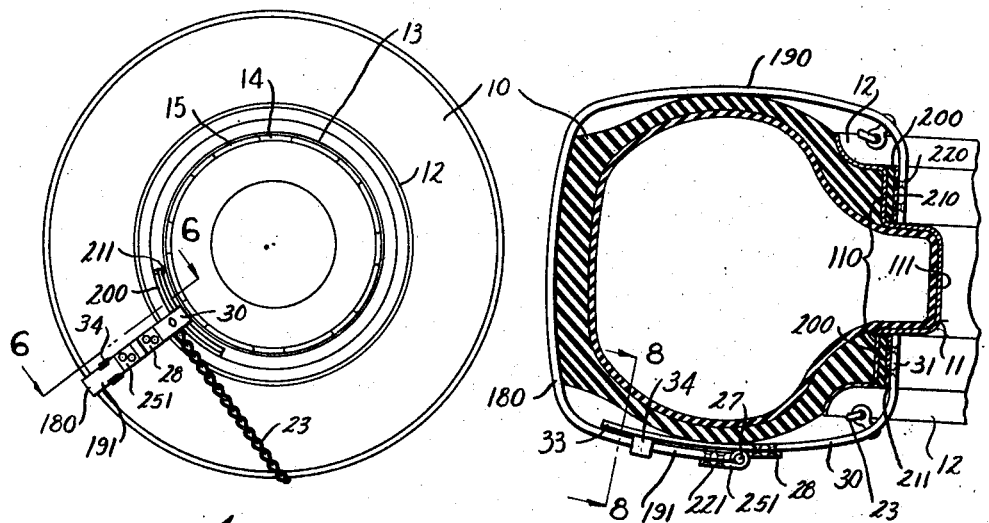
Fig. 5
Fig. 6
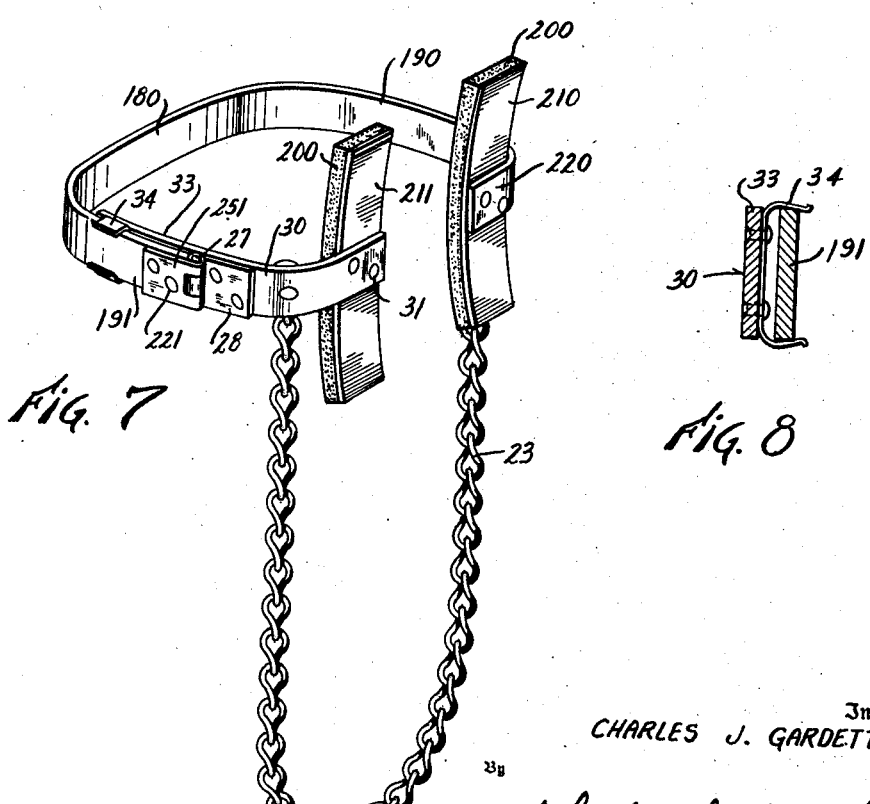
Fig. 7
Fig. 8
Inventor
CHARLES J. GARDETTO
By Wheeler, Wheeler & Wheeler
Attorneys Patented Sept. 8, 1953

2,651,347

UNITED STATES PATENT OFFICE 2,651,347

EMERGENCY TRACTION DEVICE

Charles J. Gardetto, Cudahy, Wis.

Application November 17, 1949, Serial No. 127,828

15 Claims. (Cl. 152—223)

This invention relates generally to improvements in emergency traction devices, and more particularly to a tire chain of a clamp-on type.

Although the invention has particular utility as applied to automobiles whose wheel rims either are not provided with apertures through which the conventional strap may be inserted, or where such apertures are obstructed by wheel disks or the like, the disclosed clamp constructions have advantages when applied to any type of automobile wheel.

Heretofore, the only automobile wheel chains in general use have been either those which completely encircle the peripheral circumference of the wheel, or those which are strapped transversely around the wheel.

It is the principal object of this invention to employ novel structural means for automatically increasing pressure between the clamp and wheel by utilizing the rotational energy of the wheel itself, the arrangement being such that traction on the chain increases the grip of the clamp upon the rim.

Other objects will be more apparent from an examination of the following disclosure.

In the drawings:

Fig. 5 is a view in side elevation showing a modified embodiment of the invention applied to a wheel.

Fig. 6 is a view taken in cross section on an enlarged scale.

Fig. 7 is a view in perspective of the modified embodiment of the invention shown in Fig. 6.

Fig. 8 is a detail view taken in cross section on the line 8—8 of Fig. 6.

Figure 1:
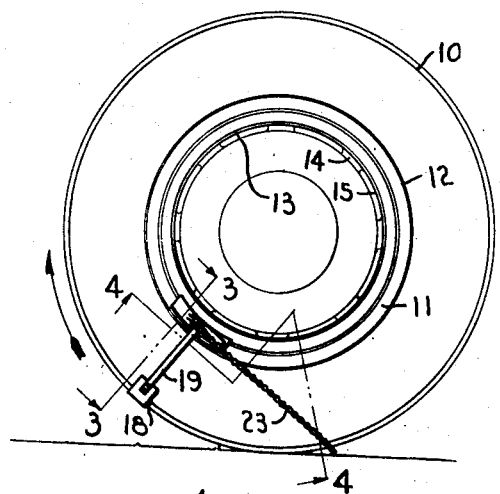
Fig. 1 is a side elevational view of the emergency chain affixed to a wheel of an automobile.

Conventional automobile wheel construction normally comprises a tire 10 mounted upon a wheel rim 11, which rim is provided at both outer peripheral edges with outwardly curving flanges 12. Between such flanges, the rim has cylindrical web portions 110 at each side of its "drop center" 111. The rim is conventionally centrally supported by a wheel which includes a felloe 13 having spokes 14 between the felloe and the rim, the spaces between the spokes being designated as apertures 15. It is through these apertures 15 that the straps of the conventional mud hook or tire chain are inserted. Even where apertures are available, however, it is not always a convenient matter to apply a chain strap as this operation requires considerable dexterity in reaching behind the wheel and frequently soils the motorist's clothing in the process. In automobiles wherein the apertures are either absent or are completely covered by wheel disks, such chains cannot be used at all. Thus, both because of convenience and necessity, it is desirable that an adequate emergency chain be made available for clamping application.

Figure 3:
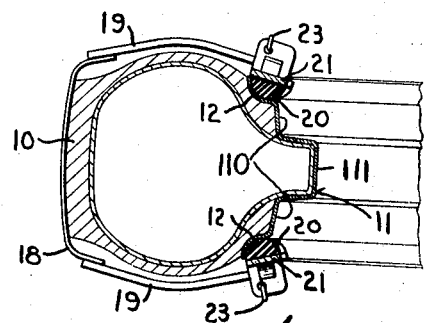
Fig. 3 is a cross sectional view taken along the line 3—3 of Fig. 1.
Figure 2:
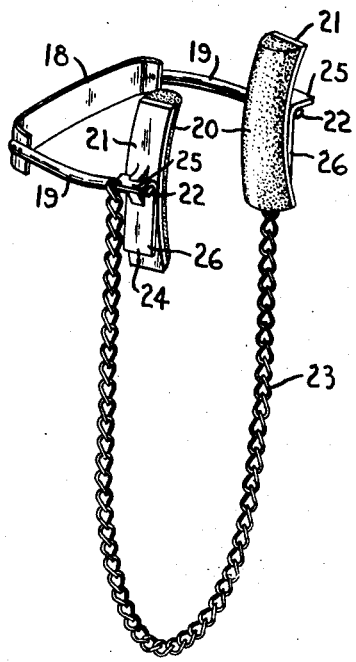
Fig. 2 is a perspective view of the emergency chain disassociated from the wheel and showing structural details.
Figure 4:
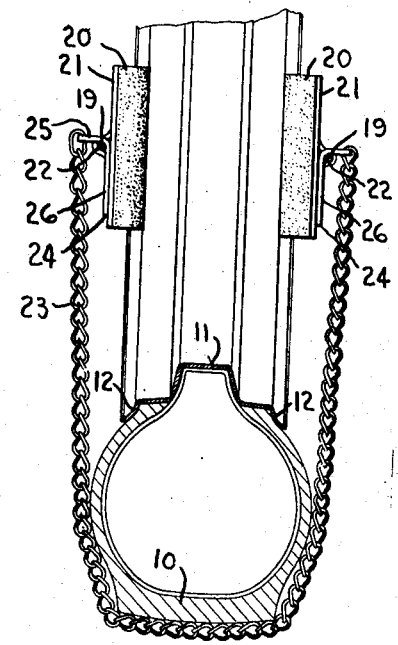
Fig. 4 is a cross sectional view taken along the line 4—4 of Fig. 1.

An emergency traction device is illustrated in Figs. 1 to 4 of the drawings which includes a clamp in which a flat spring 18 fits snugly against the road contacting surface of the tire and which is so biased as to exert clamping pressure through arm members 19 and pads 20 against the flanged portions 12 of the rim 11. The pads are desirably made of rubber or like material of high frictional coefficient. It is not contemplated that the spring act as a mud hook, that function being performed by a chain 23 to be hereinafter more fully described, but rather as a clamp and as a pivot in connection with the operation of the chain. The spring, arms, and pads are so dimensioned as to contract the spring against the tire and the pads against the outer periphery of the rim flange 12 on a diameter of the wheel, this being the shortest distance between the inner and outer circumferences of the tire.

The pads 20 are mounted on relatively rigid backs 21 which are in turn secured to the arms 19 through rocking pivots 22 which comprise the ends of the arms 19. The backs 21 and pads 20 are generally arcuately shaped and the pads 20 are rounded in transverse cross section. This shaped construction in connection with the rockable pivot support permits a close frictional fit between the pads and the contours of the flanged portions 12 of the rim 11.

The spring 18 is so biased as to enable the arms 19 to be conveniently sprung apart when the clamp is placed about the wheel. After positioning on the wheel, the spring bias is such that the clamp is held securely on the wheel with the pads engaged within the rim flanges 12. Such spring bias, however, would be insufficient to prevent the rotational influence of the wheel on the chain from dislodging the clamp under normal emergency conditions. In order to increase the clamping pressure of the pads against the rim and thus prevent the dislodgment of the clamp during operation, the chain 23 is attached to the clamp at the pad portions thereof and is of such length as to extend along a chord of the wheel at right angles to the diameter on which the arms of the clamp are disposed. Thence the chain passes about the periphery of, and increases the traction between said tire and the ground when pinched between the tire and ground as the wheel rotates.

The attachment of the chain to the pad portions of the clamp and the right angular chordal alignment assumed thereby when the chain is under tension, results in an increased clamping action of the clamp on the rim. The tension induced in the chain when it is pinched between the wheel and ground will tend to draw the clamp pads along the chord defined by the chain. However, the snug fit of the clamp about the tire will cause the spring 18 to act as a pivot about which permitted movement of the pads would necessarily be defined. Such an arcuate movement of the pads would, however, tend to force the clamp from its major chord position to a minor chord position and thus increase the distance between the spring and pads. Since the pads are restrained from such arcuate movement by contact with the inner faces of flanges 12, and the distance between the clamp spring and pads is limited by the physical dimensions thereof, chain tension will serve only to increase the frictional binding between such pads and the rim flange.

The pads are prevented from riding over the flange edges, when under chain tension, by the inward biasing influence of the spring 18 and in addition by virtue of the levered attachment of the chain to the pads. The respective ends of chain 23 are attached to the clamp at the ends 25 of the angle levers or brackets 26 which are connected with the pads and fulcrumed at the pivots 22. The levers have their resistance ends 24 bearing against the lower portions of the pad backs 21. Although the brackets 26 are shown as separate pieces pivoted on the arm ends 22, this is merely by way of illustration, it being immaterial whether they are separate from the backs 21. By means of this novel construction, chain tension is transmitted through the levers in such a manner as to force the lower portions of the pads 20 inwardly and additionally into further frictional contact with the flange portion 12 of the rim.

The emergency chain is designed to be used only to increase traction whenever the automobile has become immobilized in heavy snow or mud or the like. It is not intended to be semi-permanently affixed to the wheel as an anti-skid device, but is to be removed from the wheel as soon as the automobile has regained its mobility. Its removal is as simple as its application, the arms of the spring simply being sprung apart to free the pads from the rim.

The device shown in Figs. 5 to 8 uses a somewhat different principle in that the clamping engagement is effected through a mechanical lock rather than through resilient means. The band 180 which spans the tread surface of tire 10 comprises a relatively rigid strap having one arm 190 continuing around the inner side of the tire casing and connected rigidly at 220 with a shoe 210 which desirably has a facing pad 200.

The other arm 191 on the outside of the tire casing is provided with a rigid connection at 221 to a hinge leaf 251 which carries a pintle 27 whereby the hinge leaf 28 is pivoted to this end of the strap. The hinge leaf 28 is rigidly secured to the strap extension 30, the inwardly curved end of which is secured at 31 to the shoe 211 which, like the shoe 210, carries a pad 200. The chain 23 used with this embodiment of the invention bears the same relationship to the tire which has already been described, but is desirably connected rigidly to the arms 190 at one side of the device and to the arm extension 30 at the other, the connection being independent of the shoes 210 and 211.

The arm extension 30 has an end portion 33 which projects outwardly of the tire casing beyond the hinge as is clearly shown in Figs. 6 and 7. Near its free end, the portion 33 of the extension lever 30 carries a spring clip 34 normally engaged with the relatively rigid arm portion 191 of the strap 180, such engagement being illustrated in Figs. 6, 7 and 8.

It will be observed that whereas the pads 20 and shoes 21 of the device illustrated in Figs. 1 to 4 are directed inwardly to face each other and to engage the flanges 12 of the rim, the shoes 210 and 211 and pads 200 of the device shown in Figs. 5 to 7 are directed radially outwardly of the wheel and engage the inner peripheries of the cylindrical portions 110 of the rim, at opposite sides of its drop center 111.

The device is readily applied and removed by pivotally moving the extension 30 about its pivotal connection with the relatively rigid arm 191 of strap 180. The initial pivotal movement of the extension is opposed by the frictional grasp of the clip 34 upon the arm 191. It is further opposed by the engagement of the outwardly projecting arm 33 of extension lever 30 with the casing. However, there is enough resilience both in the casing and the strap to permit the shoe 211 to be forced free of the rim, whereupon the entire device may be disengaged from about the tire casing.

The application of the device to the tire casing is the reverse of that described. The fixed portions of strap 180 and arm 190 are engaged around the rear side of the casing with pad 200 in contact with portion 110 of the rim at the inner side of the wheel. This is readily accomplished with the strap extension 30 angularly displaced several degrees clockwise from the position illustrated in Fig. 6. With the strap 180 in a position where it is about to engage the tread portion of the casing, the strap is drawn inwardly upon the casing while at the same time, the shoe 211 and its pad 200 are forced within the cylindrical portion of the rim at the outside of the wheel. As these parts move into position, the extension lever 30 swings toward parallelism with arm 191 as illustrated in Figs. 6 and 7 and ultimately the clip 34 engages arms 191 to maintain the parts in clamping engagement with the wheel rim with its tire casing.

As in the device previously described, the chain 23 lags behind the tire-engaging strap to the extent indicated in Fig. 5, being of such a length as desirably (though not necessarily) to be approximately at right angles to the diameter of the wheel upon which the strap is disposed. The rotative thrust exerted by the tire casing upon the road, and upon that portion of the chain 23 which intervenes between the tire casing and the road, merely draws the clamping mount tighter upon the rim and the tire.

This application is a companion to my application 92,985, filed May 13, 1949, and now abandoned, wherein the device of Figs. 1 to 4 was disclosed.

From the foregoing description, taken in connection with the attached drawings, it may be seen that improved emergency chains are provided which may be clamped on to the rim of an automobile wheel and which include chains of such a length, and secured to the clamp in such a fashion, as to utilize the rotational energy of the wheel to increase the binding pressure between the clamp and the rim, so as to prevent the clamp from becoming dislodged during operation.

I claim:

1. In a traction device of the character described for engagement with an automobile wheel having a rim, a tire encircling clamp having spaced arms, rim engaging shoes connected to the free ends of said arms for contact with said rim, and a tire-encircling chain having its ends connected with said arms, the portion of the chain intermediate such connections being free and of greater length than required for direct tire encirclement whereby to encircle the tire at a point peripherally spaced from said clamp, the connections of the chain to the arms comprising lever means responsive to chain tension to frictionally bind said shoes against the rim.

2. The device of claim 1 wherein the connection between the rim engaging shoes and the arm members comprises a bell crank provided with a pivotal connection with the free end of each arm for oscillation on an axis generally longitudinal respecting the arm, the bell crank having outwardly projecting levers to which the chain is attached.

3. The device of claim 1 wherein the shoes comprise pads arcuately shaped to conform substantially to the contours of the wheel rim flanges.

4. The device of claim 1 wherein the shoes have connections to the free ends of the arms which are rigid against displacement under the tension of said chain.

5. In a traction device of the character described, the combination with a tire encircling clamp comprising a tread engageable strap portion and spaced inwardly extending arms, of rim engageable shoes connected to the inner end of the arms, and a tire encircling chain of materially greater extent than the combined length of said strap and arms, said chain having its ends connected with said clamp adjacent the inner ends of said arms and having a loop portion entirely free intermediate such ends, the connection of said chain with said arms comprising lever means responsive to chain tension to frictionally bind said shoes against said rim.

6. The device of claim 5 in which the ends of the chain are connected with said arms outwardly of said shoes.

7. The device of claim 6 in which one of said arms has a hingedly movable terminal portion carrying its respective pad and to which the chain is connected.

8. The device of claim 7 in which the hingedly movable portion comprises a lever having a pintle connecting it intermediate its ends to one of said arms, one end of said lever carrying the respective shoe and the other end extending outwardly along the tire-proximate side of the arm with which the lever is hingedly connected and provided with a clip in detachable engagement with said last mentioned arm.

9. A traction device of the character described for engagement with an automobile wheel rim and tire casing, said device comprising the combination of a tire encircling clamp having a tread engageable strap, a first arm extending inwardly across the tire and provided with an end offset for disposition within the inner periphery of a rim and provided with an outwardly facing rim engageable shoe having an arcuate surface, a second arm extending inwardly to lie in proximity to the other side wall of a tire and terminating short of said rim, and an arm extension lever in hinged connection with the terminus of said last mentioned arm and provided with a terminal offset provided with an arcuately surfaced shoe for inner peripheral engagement with said rim, detent means for securing said extension to said arm against hinged movement from a position in which its shoe is in rim engagement, said arm and extension having overlapping portions engaged by said detent.

10. The device of claim 9 in further combination with a chain having a slack intermediate portion of greater length than the combined length of said strap and arms and extension, said chain having its ends respectively connected with the first mentioned arm and with the extension of the arm second mentioned.

11. The device of claim 10 in which the said extension comprises a lever extending outwardly beyond its hinged connection with the second mentioned arm along the tire-proximate side of said arm, the said detent means comprising a spring clip carried by the outer end of the lever in a position for releasable engagement with an intermediate portion of the second mentioned arm.

12. In a device of the character described, an automobile wheel-rim-engaging clamp comprising a spring member, arm members fixed at each end of said spring member and which partially encircle a tire mounted on said automobile wheel, and rim engaging pads having backs in pivoted connection to the ends of said arms remote from said spring, said pads being arcuately shaped and of rounded cross section for engageable contact with the automobile rim, said spring being so biased as to urge said pads toward each other.

13. In an emergency traction device adapted for engagement with an automobile wheel having a rim, the combination with a spring clamp comprising spaced arms adapted to be positioned at either side of the wheel along a major chord of said wheel, friction pads connected to the inner ends of said arms for contact with a portion of said rim, and a traction chain connected to the clamp at spaced points near the respective pads and of such length between said points as to pass about the wheel along a minor chord of said wheel and substantially normal to said clamp arms when placed under tension, the connection of said chain to said clamp comprising lever means responsive to chain tension to frictionally bind the pads to the rim flanges.

14. The device of claim 13 wherein the pads are provided with lever arms to which said traction chain is connected at points offset outwardly of the pads, whereby tension on the chain will force portions of said pads against said rims.

15. The device of claim 14 wherein the pads are provided with relatively rigid backs and friction faces and said offset clamp portions comprise brackets extending outwardly from said backs.

CHARLES J. GARDETTO.

References Cited in the file of this patent

UNITED STATES PATENTS

| Number | Name | Date |
|---|---|---|
| 1,255,534 | Hons | Feb. 5, 1918 |
| 1,537,862 | Mohr | May 12, 1925 |
| 1,994,065 | Dean | Mar. 12, 1935 |
| 2,440,863 | Liggio | May 4, 1948 |
| 2,457,208 | Carpenter | Dec. 28, 1948 |